Nov. 4, 1941. R. V. MORRIS 2,261,808
METHOD OF PRESERVING FISH
Filed April 23, 1938
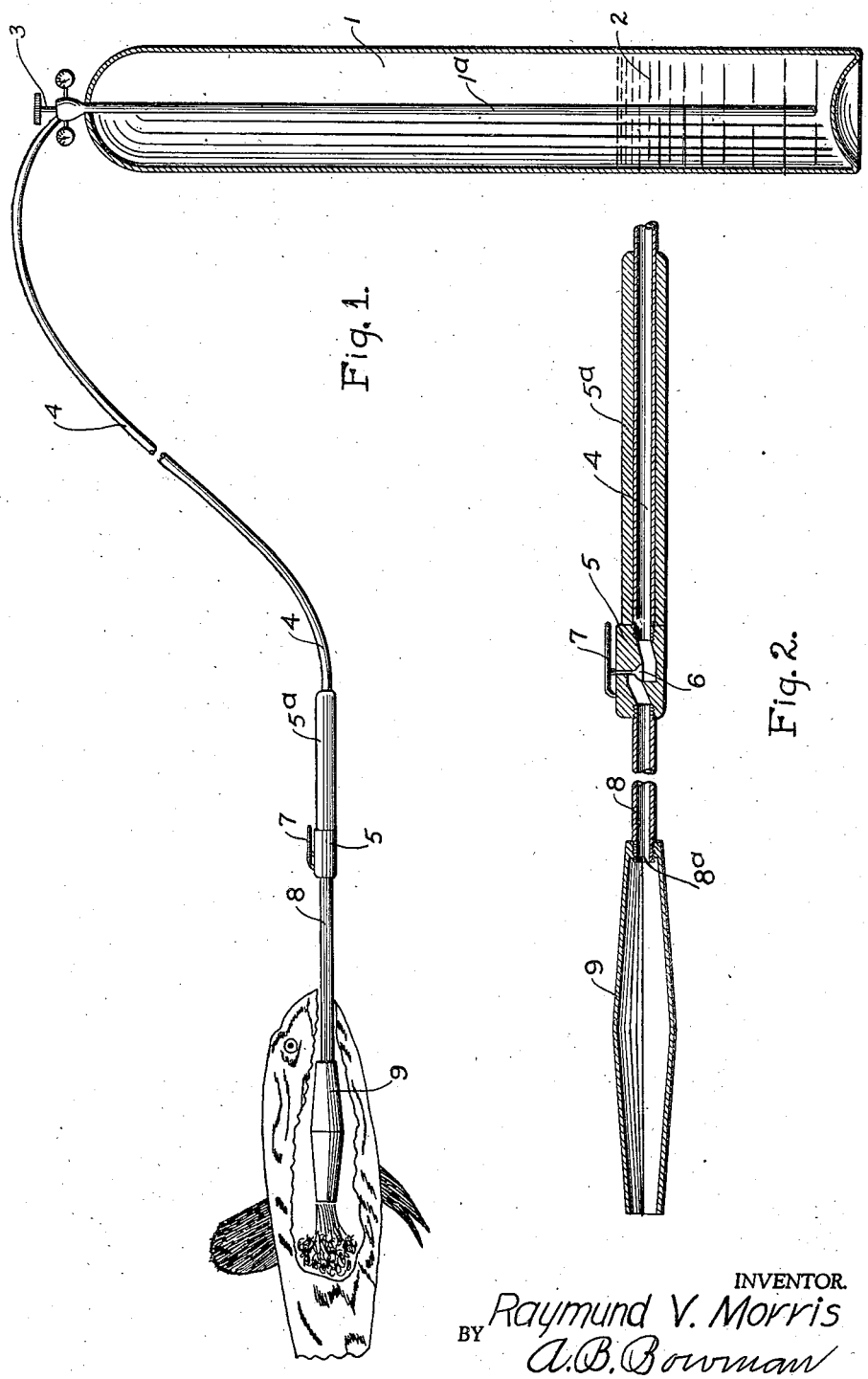
INVENTOR.
Raymund V. Morris
BY A. B. Bowman
ATTORNEY.

Patented Nov. 4, 1941

2,261,808

UNITED STATES PATENT OFFICE 2,261,808

METHOD OF PRESERVING FISH

Raymund V. Morris, Coronado, Calif.

Application April 23, 1938, Serial No. 203,858

1 Claim. (Cl. 99—195)

My invention relates to a method of preserving fish, particularly large fish while they are on the boat in the process of catching, and the objects of my invention are:

First, to provide a novel method of treating the interior of fish to prevent them from spoiling before they are ready for packing or for sale;

Second, to provide a method of this class which may be readily applied to the fish while on the boat immediately after they are caught, or otherwise as desired;

Third, to provide a method of this class which is applied to the individual fish, particularly the large ones to prevent early deterioration thereof;

Fourth, to provide a method of absorbing the latent heat on the inside of the fish to pre-chill or pre-freeze the fish from the inside outwardly to be protected against spoilage during the time required for freezing to be accomplished from outside refrigeration;

Fifth, to provide a method of this class in which the apparatus used is very simple and easily portable; and Sixth, to provide a method of this class which is very efficient and simple and economical to apply.

With these and other objects in view as will appear hereinafter, my invention consists of a certain novel method of preserving fish as will be hereinafter described in detail and particularly set forth in the appended claim, reference being had to the accompanying drawing and the characters of reference thereon which form a part of this application in which:

Figure 1 is a diagrammatic view generally of the equipment which may be used in carrying out my method and Fig. 2 is an enlarged sectional view of the means of applying my method to the fish.

The equipment may be described generally as follows:

A carbon dioxide tank 1 which may be of any conventional type with siphon tube 1a therein is used and it is filled or partially filled with liquid carbon dioxide 2 which is placed in the tank 1 under compression in the conventional manner, the tank being provided with a valve 3 in its outlet for releasing the same and controlling the pressure as desired. Connecting with the outlet of this tank 1 is a flexible high pressure tube or hose 4. This tube 4 connects at its extended end with a valve casing 5 to provide means to deliver liquid carbon dioxide to said valve 5. This valve casing 5 is provided with an extended hand grip portion 5a which extends over the end of the tube and provides a grip for the hand of the operator and through which the end 4a of the tube 4 extends as shown best in Fig. 2 of the drawing. This valve casing 5 is provided with a valve 6 therein which is operated by a handle 7 for opening and closing the valve for controlling the flow of fluid from the tank 1.

Connected with the casing 5 at the opposite end from the handle portion 5a is a tube or pipe 8 which is rigid, and the end of this pipe 8 forms a nozzle 8a and over the nozzle is secured the expansion member 9 which is larger than the pipe 8 and the remaining portion to provide for expansion of the fluid at this point for providing refrigeration. This expansion member 9 and the tube 8 are of sufficient length to extend substantially to the middle of a large fish that are ordinarily caught on the fishing boat.

My method in connection with the use of the hereinbefore described equipment is as follows:

The tank 1 filled or partially filled with liquid carbon dioxide under compression is provided together with the tube and other equipment and are taken aboard the boat or transported to any other place where it is desired to preserve the fish temporarily. Then as the fish are caught, or within a reasonable time afterward, the operator grasps the handle 5a and introduces the expansion member 9 into the mouth of the fish, particularly the larger ones and forces it into the fish. After it has reached its proper position which is substantially the middle of the fish, the handle 7 is depressed permitting a small quantity of the liquid carbon dioxide to pass through the tube 4, valve 6, tube 8, and nozzle 8a, and it expands into the expansion member 9 and moves of its own expansion into the entrails of the fish. The nozzle is then withdrawn and applied to other fish as desired.

It will be here noted that instead of introducing the carbon dioxide as hereinbefore described, that introduction of solidified carbon dioxide into the inside of fish for the purpose of chilling, freezing, and preserving the fish for cooling it from the inside outwardly previous to the refrigeration from the outside is a modified form of my method.

It will be here noted that the equipment disclosed herein is only one form of equipment and may be changed, substituted, or varied without in any way affecting my method of preserving fish and it is only disclosed for illustrative purposes.

Though I have shown and described a particular equipment and method of preserving fish, I do not wish to be limited to this particular equipment, nor to the method as disclosed, but desire to include in the scope of my invention, the method substantially as set forth in the appended claim.

Having thus described my invention, what I claim as new and desire to secure by Letters Patent is:

The herein described method of preserving fish, consisting in introducing an expansion nozzle into the stomach of a fish through its mouth, then releasing liquid carbon dioxide under pressure through said expansion nozzle directly and openly into the stomach of the fish.

RAYMUND V. MORRIS.